Nov. 24, 1970     E. K. CLARDY     3,542,516

FLAME IONIZATION DETECTION

Filed Oct. 9, 1968     2 Sheets—Sheet 1

INVENTOR.
E. K. CLARDY
BY Young + Quigg
ATTORNEYS

United States Patent Office 3,542,516
Patented Nov. 24, 1970

3,542,516
FLAME IONIZATION DETECTION
Edwin K. Clardy, Bartlesville, Okla., assignor to Phillips Petroleum Company, a corporation of Delaware
Filed Oct. 9, 1968, Ser. No. 766,224
Int. Cl. G01n *31/12*
U.S. Cl. 23—232                         12 Claims

ABSTRACT OF THE DISCLOSURE

In a flame ionization detection system, increased signal to noise ratios and increased signal currents are obtained by operation of the detection system using electrode voltages in the range between saturation and arcing which is higher than the normally used saturation voltage range.

---

Figure 2:
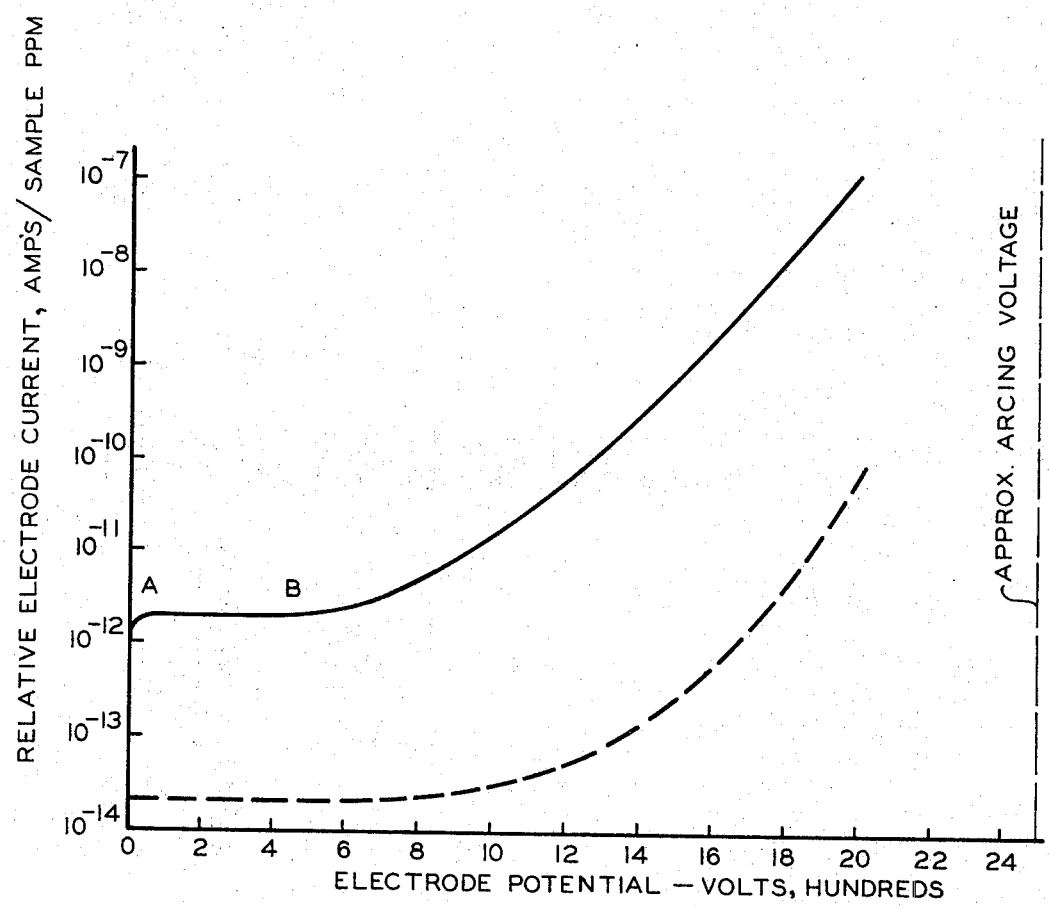

This invention involves a method of flame ionization detection.

Flame ionization detection systems are known to be valuable as tools of analysis, especially in the field of flame detection chromatography and other applications calling for detection of a flame ionizable substance in a sample of fluid.

A flame ionization detector consists of a cathode and an anode positioned with respect to a burning flame and differing sufficiently in electrical potential so that the presence of ionization within the flame will result in a flow of electrical current from anode to cathode. When the flame used is obtained by burning a substance which forms very few ions during oxidation, hydrogen, for example, the current flow through the flame will be extremely small. When a sample of fluid containing a flame ionizable material is introduced into the flame, however, the ions formed by the material cause a current to flow from anode to cathode. This current is then amplified to obtain the magnitude of signal necessary for recording and interpreting the results.

It is generally recognized that the electrical potential between the anode and the cathode can determine the amount of current flow at relatively low applied voltages which are below the saturation voltage. The saturation voltage is recognized as a range of applied anode-cathode voltage, usually between 20 and 500 volts with the exact upper and lower voltages depending upon the physical arrangement of the electrodes and other variables. The saturation voltage range is characterized by the fact that a change of applied voltage within the specified range will not result in an appreciable change in current flow from anode to cathode. An applied anode-cathode voltage somewhere within the saturation range has heretofore been recognized as the optimum operating point for a flame ionization detector with potentials of 100–300 volts being used in most hydrogen flame ionization detection systems. Operation at higher voltages has been considered impractical and generally less advantageous than operation within the saturation range.

When operating a flame ionization detection device at voltages within the saturation range, the current flow from anode to cathode is extremely small necessitating the use of complex and costly detection and amplification systems in order to obtain a signal suitable for use in recording and interpreting fluctuations in current flow. A device commonly used in hydrogen flame ionization detectors is the electrometer tube, an extremely sensitive device which is capable of detecting minute electrical currents but which is also subject to interference due to vibration and magnetic variations.

In accordance with the present invention, the flame detector is operated with the anode-cathode potential considerably above the commonly used saturation range. Operation in the range between saturation and the voltage at which electrical arcing between anode and cathode would take place has many unexpected advantages over operation at lower voltages.

At voltages above the saturation range, the current flow from anode to cathode for a constant amount of flame ionizable material within the flame increases as the applied voltage is increased. An unexpected and extremely useful phenomenon which occurs in this voltage range is that as the voltage is increased, the signal increases faster than the noise resulting in extremely favorable signal noise ratios in the high voltage mode of operation. In addition to making possible the use of less expensive detection equipment, lower concentrations of sample can be detected with the stronger signal and lower noise level which this mode of operation provides.

One object of the present invention is to provide a method of flame ionization detection which increases the accuracy of ionization measurements.

Another object of the present invention is to provide a method of flame ionization detection which produces a high-level data signal.

A further object of the present invention is to provide a method of flame ionization detection which produces a low noise level and high signal to noise ratio.

Still another object of the present invention is to provide a method of flame ionization detection capable of detecting extremely small concentrations of ion-producing substances.

Figure 1:
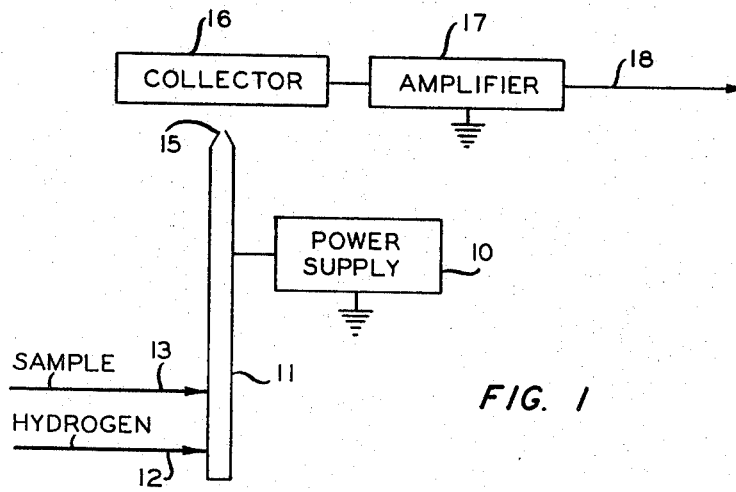
Figure 3:
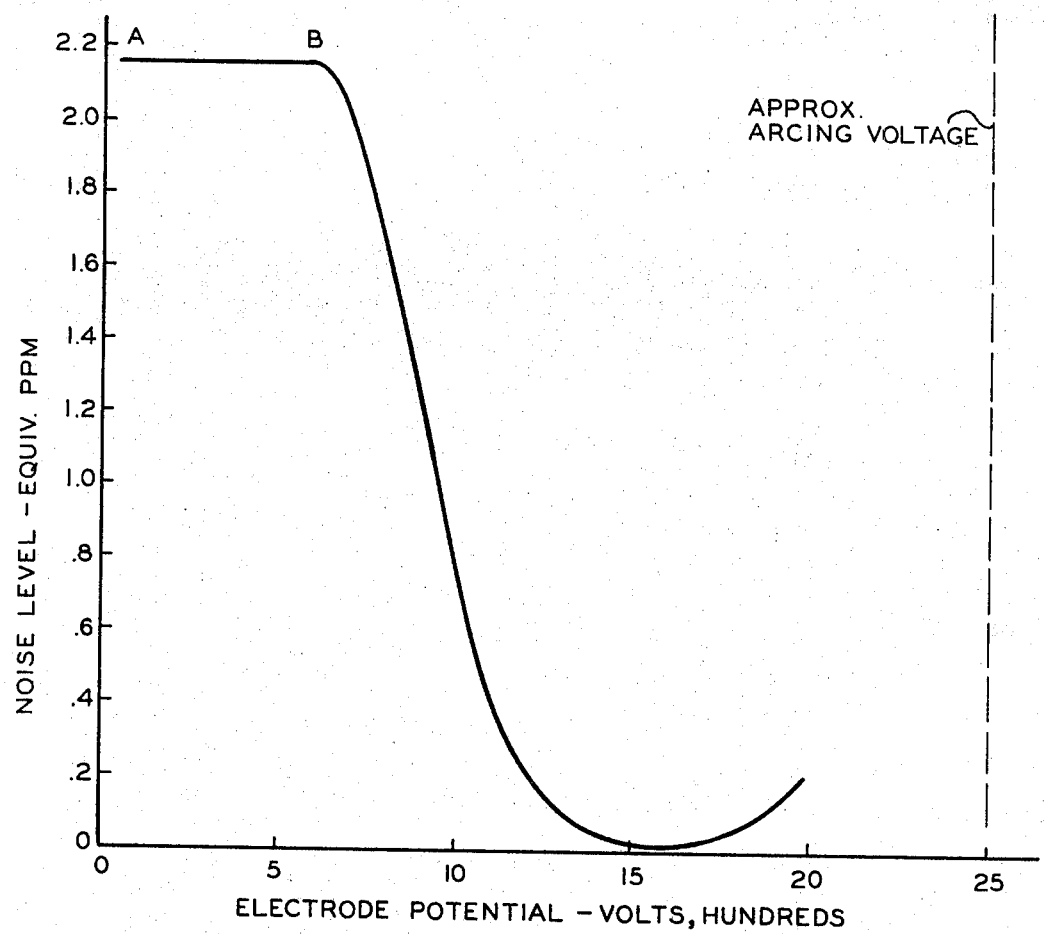

Other objects and advantages of the invention should become apparent from the following detailed description in conjunction with the accompanying drawing wherein FIG. 1 is a schematic representation of a typical hydrogen flame ionization detector, FIG. 2 is a graphical representation of the relative signal and noise strengths at various anode to cathode voltages, and FIG. 3 is a graphical representation of the noise level in equivalent parts per million of sample for various operating anode to cathode voltages.

Referring now to FIG. 1, a power supply 10 is connected between ground and electrode burner 11 in order to impart to the electrode burner 11 the desired electrical potential. Hydrogen is provided to the electrode burner 11 through a hydrogen conduit 12, and a sample of fluid for analysis is introduced to the electrode burner 11 through the sample conduit 13. Combustion of the hydrogen and sample mixture takes place above the burner electrode tip 15, and the ionization caused by the combustion of the sample material makes it possible for electric current to flow between the electrode burner 11 and the collector 16. An amplifier 17 acts upon the collector current signal to produce an output signal 18 suitable for recording or other means of analysis. In the embodiment shown, the burner electrode 11 can be either electrically positive or negative with respect to the collector 16. Any other type of properly insulated flame ionization detector, including those types wherein the burner tip is not utilized as an electrical element, is also operable in accordance with the present invention. However, best results are obtained by using an electrode configuration which results in the most concentrated electric field between anode and cathode.

When the burner tip is utilized as an electrode, accuracy and sensitivity can be even further increased by using a tip which is tapered to a sharp point at the end nearest the collector electrode. The additional increase in sensitivity thus obtained is generally dependent upon the sharpness of the point to which the end of the tip is shaped.

FIG. 2 is a semi-logarithmic graph showing the relationship between the electrode potential and electrode current. The linear electrode potential abscissa covers a range of 0 to 2500 volts, the latter voltage being the approximate arcing potential for the particular hydrogen flame detector used, and the relative electrode current ordinate axis covers 7 logarithmic cycles. The relative output signal for a given electrode potential is shown by the solid line upon which the saturation area of operation is located between points A and B. When operated at voltages in excess of point B, an ion multiplication phenomenon causes an extremely rapid increase in electrode current as the electrode potential is raised. The broken line shows the relative amount of noise current which is produced at various electrode potentials. It can readily be seen that the vertical distance between the solid line and the broken line is a representation of the signal to noise ratio at a given electrode potential, and that this ratio increases significantly as the electrode potential is increased above the saturation range. Although the exact location of the signal and noise curves will vary with respect to each other as the impurity concentration in the sample under analysis or the configuration of the flame detector used is changed, the general relationship between the two curves remains the same.

FIG. 3 shows the noise level in equivalent parts per million of sample for various electrode potentials. The saturation range of operation is located between points A and B. It can be seen that above the saturation region, the noise level decreases rapidly as the electrode potential is increased. Operation of the hydrogen flame detection device in the area of low noise level which is obtained at a relatively high electrode potential results in more accurate analysis in addition to making possible analysis of extremely dilute samples.

FIGS. 2 and 3 show that the area of improved operation for a flame ionization detector of the type illustrated in FIG. 1 begins at the point at which ion multiplication begins to take place within the flame, which is about 600 volts, or a little less than ¼ of the approximate arcing voltage for the type of detector shown in FIG. 1. As the electrode potential is increased to approximately 900 volts, the noise level shown by FIG. 3 is reduced to approximately half the saturation mode level. At approximately 1200 volts the noise level is reduced to approximately 10 percent of the saturation noise level. The lowest noise levels and highest signal to noise ratios are exhibited between 1200 and 1800 volts with the noise level dropping to its lowest point at about 1600 volts. Operation above 1800 volts yields continuing favorable signal to noise ratios and noise levels, but operation above 2000 volts or approximately ⅘ of the arcing voltage of an ionization detector increases the possibility that arcing may occur thereby damaging the flame ionization detection apparatus. Thus, the applied potential should be in the range of 600 to 2000 volts. An advantageous range which safeguards the safety of the equipment used in flame ionization detection can be established by ascertaining the extent of the voltage range between the highest saturation voltage just before ion multiplication begins to take place and the approximate arcing voltage of the particular equivalent used, then maintaining operation in the middle 60 percent of that determined range. This range can be expressed mathematically in terms of the arcing voltage, A, and the highest saturation voltage before ion multiplication, S, as from $S+.2(A-S)$ to $A-.2(A-S)$.

Although the invention has been described in detail with reference to a preferred embodiment, it is not intended to be limited thereto as it is obvious that the invention can be practiced with other embodiments.

I claim:

1. A method of ionization detection comprising burning a combustible reference gas to which a sample of the substance to be analyzed has been added, applying a voltage of from 600 to 2000 volts across the resulting flame, and measuring the amount of current flow through said flame.

2. The method of claim 1 wherein said voltage is in the range of 900 to 2000 volts.

3. The method of claim 1 wherein said voltage is in the range of 1200 to 1800 volts.

4. The method of claim 1 wherein said voltage is in the range of from ¼ of the voltage at which arcing between said anode and said cathode will occur to ⅘ of the voltage at which said arcing will occur.

5. The method of claim 1 wherein said operating voltage is within the range in which ion multiplication takes place within the flame.

6. The method of claim 1 wherein said voltage is between the saturation voltage and the voltage at which arcing will occur for the particular flame detector used.

7. The method of claim 1 wherein said voltage is from $S+.2(A-S)$ volts to $A-.2(A-S)$ volts, where S is the highest saturation voltage of a particular detection device and A is the arcing voltage of said device.

8. The method of claim 1 wherein said voltage is about 1200 volts.

9. The method of claim 1 wherein said voltage is about 1600 volts.

10. A flame ionization detector comprising, in combination, electrode burner means, collector means, power means, power supply means for applying a voltage of from 600 to 2000 volts between said electrode burner means and said collector means, means to supply combustible fluid to said electrode burner means, and means for determining the amount of electric current flowing between said electrode burner means and said collector means.

11. The apparatus of claim 10 wherein said electrode burner means is a tubular structure having an inlet end and an outlet end in juxtaposition with said collector means shaped so that the walls of said tubular structure diminish to a sharp edge at the outlet end of said structure.

12. A flame ionization detector comprising flame producing means, anode means, cathode means, means for applying a voltage of from 600 to 2000 volts between said anode and said cathode means, and means for detecting the amount of electrical current flowing from said anode means to said cathode means.

References Cited

UNITED STATES PATENTS 3,039,856  6/1962  McWilliam.

MORRIS O. WOLK, Primary Examiner

R. M. REESE, Assistant Examiner

U.S. Cl. X.R.

23—254

UNITED STATES PATENT OFFICE
CERTIFICATE OF CORRECTION

Patent No. 3,542,516                      Dated     November 24, 1970

Inventor(s) Edwin K. Clardy

It is certified that error appears in the above-identified patent and that said Letters Patent are hereby corrected as shown below:

Column 4, lines 35 and 36, cancel "power means,".

Signed and sealed this 2nd day of March 1971.

(SEAL)
Attest:

EDWARD M. FLETCHER, JR.            WILLIAM E. SCHUYLER,
Attesting Officer                      Commissioner of Paten